US009026551B2

(12) United States Patent
Drennan, III

(10) Patent No.: US 9,026,551 B2
(45) Date of Patent: May 5, 2015

(54) SYSTEM AND METHOD FOR EVALUATING TEXT TO SUPPORT MULTIPLE INSURANCE APPLICATIONS

(71) Applicant: Arthur Paul Drennan, III, West Granby, CT (US)

(72) Inventor: Arthur Paul Drennan, III, West Granby, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 183 days.

(21) Appl. No.: 13/925,996

(22) Filed: Jun. 25, 2013

(65) Prior Publication Data

US 2014/0379386 A1    Dec. 25, 2014

(51) Int. Cl.
*G06F 17/30* (2006.01)
*G06Q 40/08* (2012.01)
*G06F 17/20* (2006.01)
*G06Q 10/10* (2012.01)

(52) U.S. Cl.
CPC .......... *G06Q 40/08* (2013.01); *G06F 17/30572* (2013.01); *G06F 17/20* (2013.01); *G06Q 10/10* (2013.01)

(58) Field of Classification Search
CPC ............................................... G06F 17/30572
USPC ................................ 707/758, 776
See application file for complete search history.

(56) References Cited

U.S. PATENT DOCUMENTS

| 7,570,262 | B2 * | 8/2009 | Landau et al. ................ 345/440 |
| 7,739,133 | B1 | 6/2010 | Hail et al. |
| 7,937,349 | B2 | 5/2011 | Pucher |
| 7,966,204 | B1 | 6/2011 | Hail et al. |
| 8,055,603 | B2 * | 11/2011 | Angell et al. ................... 706/47 |
| 8,213,725 | B2 * | 7/2012 | Loui et al. ..................... 382/224 |
| 8,359,287 | B2 | 1/2013 | Pucher |
| 2005/0028046 | A1 | 2/2005 | McArdle |
| 2008/0071800 | A1 * | 3/2008 | Neogi et al. .................. 707/100 |
| 2010/0124378 | A1 * | 5/2010 | Das et al. ...................... 382/225 |
| 2011/0054925 | A1 | 3/2011 | Ghani et al. |
| 2012/0173289 | A1 | 7/2012 | Pollard et al. |

* cited by examiner

*Primary Examiner* — Cam-Linh Nguyen
(74) *Attorney, Agent, or Firm* — Buckley, Maschoff & Talwalkar LLC

(57) ABSTRACT

A system for evaluating text data to support multiple insurance applications is disclosed. In some embodiments, text input data is received from multiple sources. The text input data may then be aggregated and mapped to create composite text input data. A semantic event in the composite text input data may be automatically detected, such as by being triggered by a semantic rule and associated semantic tag. A text mining result database may be updated by adding an entry to the database identifying the detected semantic event and the triggering semantic rule. An indication associated with the text mining result database may then be transmitted to a plurality of insurance applications.

19 Claims, 10 Drawing Sheets

| TEXT MINING RESULT IDENTIFIER 502 | LOSS EVENT 504 | DATE 506 | RULE IDENTIFIER 508 | CLAIM IDENTIFIER 510 |
|---|---|---|---|---|
| TMR_10001 | ANIMAL BITE | 7/15/2010 | SR_100001 | C_4389523 |
| TMR_10002 | BACK INJURY | 4/21/2014 | SR_100010 | C_8782378 |
| TMR_10003 | ACCIDENT | 11/30/2015 | SR_100093 | C_1348933 |
| TMR_10004 | BACK INJURY | 1/14/2016 | SR_100010 | C_2372978 |
| TMR_10005 | PREGNANCY | 7/15/2016 | SR_100077 | C_0983778 |

*FIG. 5*

SYSTEM AND METHOD FOR EVALUATING TEXT TO SUPPORT MULTIPLE INSURANCE APPLICATIONS

BACKGROUND

An entity, such as an insurance company, may want to analyze or "mine" large amounts of data, such as text data. For example, an insurance company might want to analyze tens of thousands of insurance claim text files to look for patterns (e.g., a particular type of injury has occurred more frequently for employees who work in a particular industry). Note that an entity might analyze this data in correction with different types of applications, and, moreover, different applications may need to analyze the data differently. For example, the term "IV" might referent to an "Insured Vehicle" when it appears in an automobile accident report and to "Intra-Venous" when it appears in a medical file. It can be difficult to identify patterns across such large amounts of data and different types of applications. In addition, manually managing the different needs and requirements (e.g., different business logic rules) associated with different applications can be a time consuming and error prone process. As a result, it would be desirable to provide systems and methods for efficiently and accurately mining text data.

SUMMARY OF THE INVENTION

According to some embodiments, systems, methods, apparatus, computer program code and means for efficiently and accurately mining text data. In some embodiments, text input data is received from multiple sources. The received text input data may then be aggregated and mapped to create composite text input data. A semantic event in the composite text input data may be automatically detected, such as by being triggered by a semantic rule and associated semantic tag. A text mining result database may be updated by adding an entry to the database identifying the detected semantic event and the triggering semantic rule. An indication associated with the text mining result database may then be transmitted to a plurality of insurance applications.

Some embodiments provide: means for receiving, at a text mining platform, text input data from multiple sources; means for aggregating and mapping the text input data to create composite text input data; means for automatically detecting, by a computer processor of the text mining platform, a semantic event in the composite text input data triggered by a semantic rule and associated semantic tag; means for updating, by the computer processor, a text mining result database by adding an entry to the database identifying the detected semantic event and the triggering semantic rule; and means for transmitting, by the computer processor, an indication associated with the text mining result database to a plurality of insurance applications.

A technical effect of some embodiments of the invention is an improved and computerized way of mining text providing improved results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 illustrates a tabular portion of a text mining results database in accordance with some embodiments.

DETAILED DESCRIPTION

Figure 1:
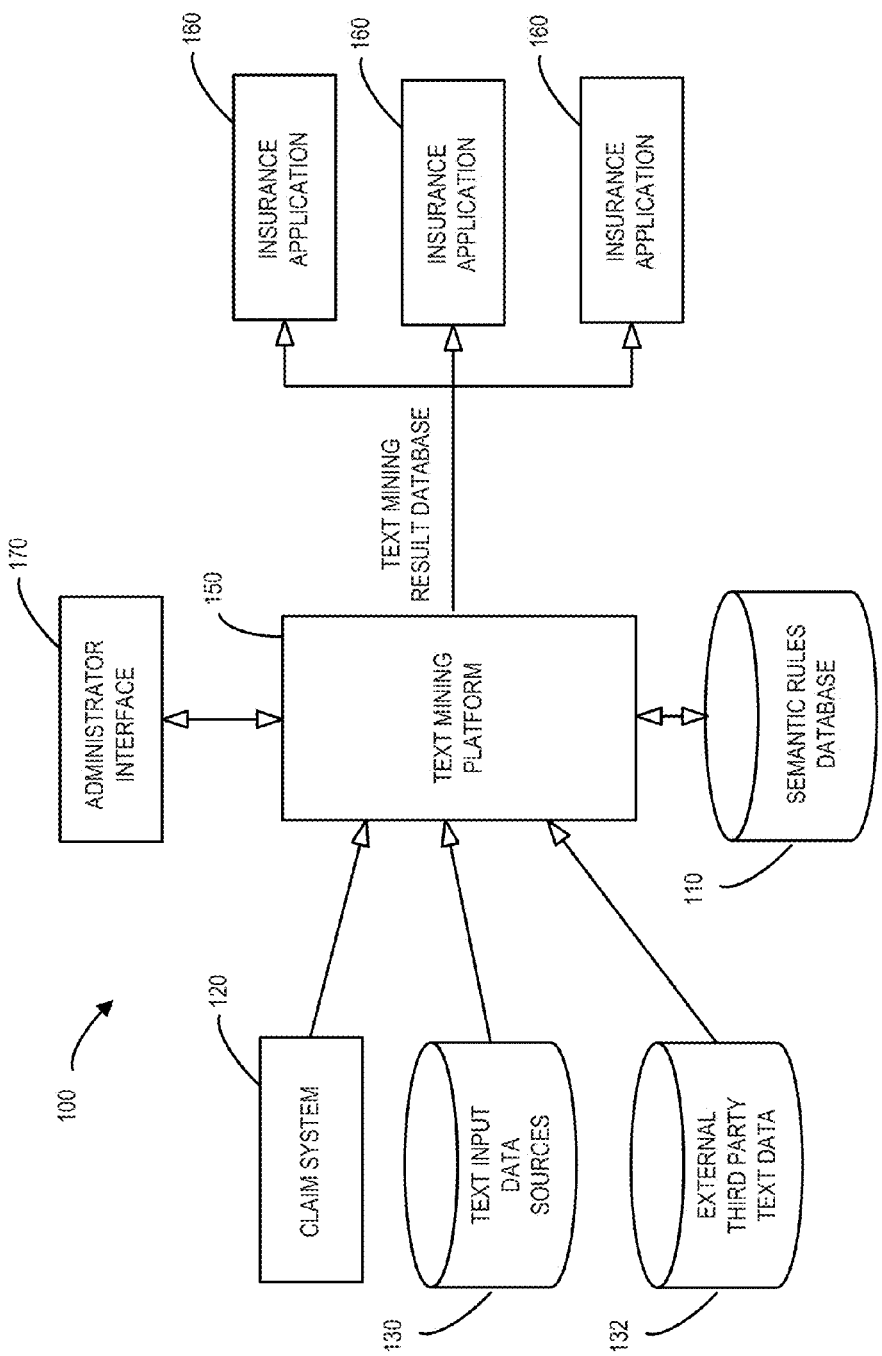
FIG. 1 is block diagram of a system according to some embodiments of the present invention.

An enterprise may want to analyze or "mine" large amounts of data, such as text data received from various sources. By way of example, an insurance company might want to analyze tens of thousands of insurance claim text files to look for patterns (e.g., to find patterns of factors that may help indicate a likely recovery period length will be associated with a particular type of injury). Note that an entity might analyze this data in correction with different types of applications and that different applications may need to analyze the data differently. It may therefore be desirable to provide systems and methods to mine text data in an automated, efficient, and accurate manner. FIG. 1 is block diagram of a system 100 according to some embodiments of the present invention. In particular, the system 100 includes a text mining platform 150 that receives information from a semantic rules database 110, a claim system 120, one or more text input data sources 130 (e.g., internal to an insurance enterprise), and/or external third party text data 132 (e.g., reports issued by the National Highway Safety Board). The text mining platform 150 might be, for example, associated with a Personal Computers (PC), laptop computer, an enterprise server, a server farm, and/or a database or similar storage devices. The text mining platform 150 may, according to some embodiments, be associated with a business organization or an insurance provider.

As used herein, devices, including those associated with the text mining platform 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" text mining platform 150 may access semantic rules in the semantic rules database 110 to mine the information from the claim system 120 and/or the other text input data sources 130. As used herein, the term "automated" may refer to, for example, actions that can be performed with little or no human intervention.

The text mining platform 150 may store information into and/or retrieve information from the semantic rules database 110 and/or a text mining result database that is output to various external insurance applications 160 (e.g., software applications or devices associated with subrogation, fraud detection, and/or recovery factor analysis). The semantic rules database 110 may be a locally stored relational database or reside remote from the text mining platform 150. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface 170 may provide an ability to access and/or modify the semantic rules database 110 via the text mining platform 150. The administrator interface 170 might, for example, let an administrator define terms, dictionaries, mapping rules, etc. associated with text mining. The data sources 130, 132 may be thought of as "publishers" of information to be consumed by the text mining platform 150, and the insurance applications 160 may be considered "subscribers" to information created by the text mining platform 150. Moreover, note that the text mining platform 150 may operate asynchronously and/or independently of any insurance application 160.

Although a single text mining platform 150 is shown in FIG. 1, any number of such devices may be included. Moreover, various devices described herein might be combined according to embodiments of the present invention. For example, in some embodiments, the text mining platform 150 and semantic rules database 110 might be co-located and/or may comprise a single apparatus.

Figure 2:
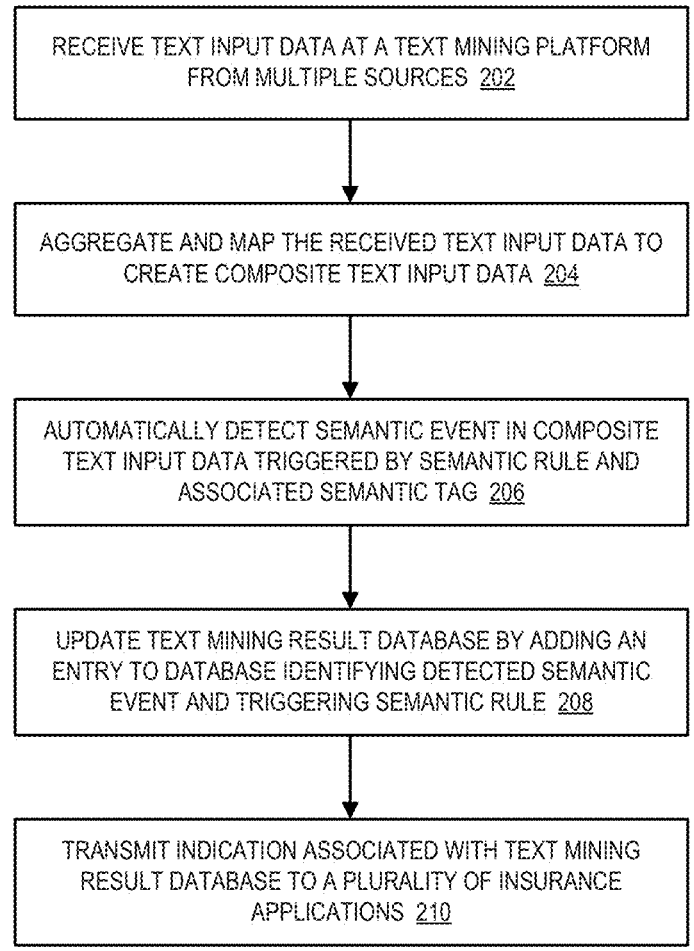
FIG. 2 illustrates a method in accordance with some embodiments of the present invention.

In this way, the system 100 may mine text in an efficient and accurate manner. For example, FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, text input data is received at a text mining platform from multiple sources. For example, thousands of insurance claim files may be received on a periodic basis or in substantially real time. Although insurance claim files are described in connection with some embodiments herein, note that other types of information may also be received and/or analyzed. For example, the text input data might be associated an insurance claim note, a medical report, a police report, social network data, a loss description, an injury description, a Final Notice Of Loss ("FNOL") statement, a telephone call transcript (e.g., create via a voice recognition application), Optical Character Recognition ("OCR") data, third-party data, and/or a governmental agency (e.g., weather reports).

At 204, the received text input data is aggregated and mapped to create composite input text data. For example, the received text input data might be rearranged, converted into a standard format, fields may be mapped in accordance with a source identifier, abbreviations, words, and/or phrases may be modified as appropriate to a common usage, etc.

At 206, a semantic event may be automatically detected in the composite text input data triggered by a semantic rule and associated semantic tag. According to some embodiments, the semantic event may be associated with the triggering detection of a word, a phrase, a shorthand term, a prescription drug, and/or an insurance carrier name. The triggering semantic rule might be associated with, for example, a noun, a verb, a definition, a semantic tree, a named entity recognition rule, a root, a noun phrase, a prepositional phrase, and/or a verb phrase. According to some embodiments, the triggering semantic rule was previously defined by an administrator using a graphical user interface. In some cases, one or more pre-determined conditions may be applied to flag the detected semantic event (e.g., to reduce the number of semantic events to be eventually reported to insurance applications). For example, a pre-determined condition may require that a word or phrase must be detected a pre-determined number of times or within a pre-determined proximity of another word or phrase.

A text mining result database may be updated at 208 by adding an entry to the database identifying the detected semantic event and the triggering semantic rule (note that, if applicable, only flagged events may result in a new entry being created in the database). The added entry might, for example, include a file note identifier, an insert date, a text source, a rule identifier, and/or a line of business.

At 210, an indication associated with the text mining result database may be transmitted to a plurality of insurance applications. The insurance applications might be associated with, for example, a workers' compensation claim, a personal insurance policy, a business insurance policy, an automobile insurance policy, a home insurance policy, a sentiment analysis, insurance event detection, a cluster analysis, a predictive model, a subrogation analysis, fraud detection, a recovery factor analysis, large loss and volatile claim detection, a premium evasion analysis, an insurance policy comparison, an underwriting decision, and/or indicator incidence rate trending application. Note that the transmitted indication might be used to trigger an insurance application (e.g., by triggering a fraud detection analysis) and/or update an insurance application (e.g., by updating a variable or weighing factor of a predictive model).

Figure 3:
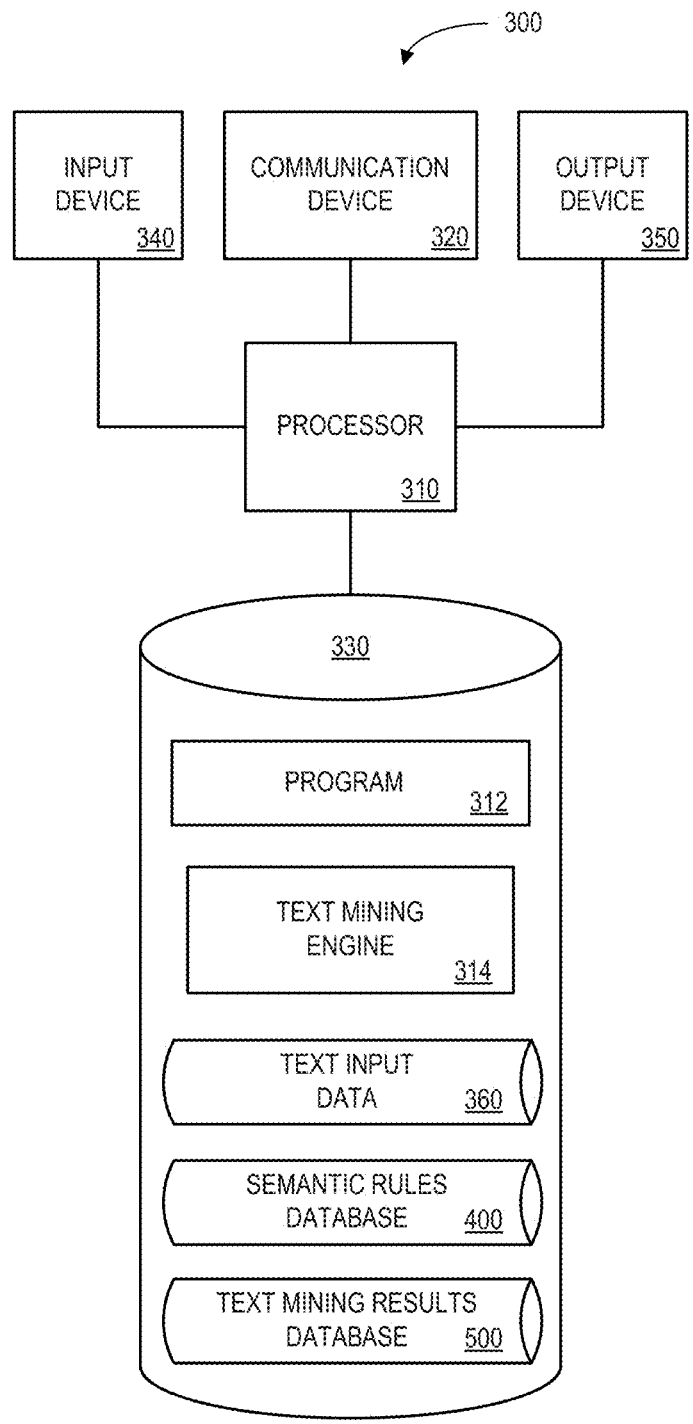
FIG. 3 is block diagram of a text mining platform according to some embodiments of the present invention.

The embodiments described herein may be implemented using any number of different hardware configurations. For example, FIG. 3 illustrates a text mining apparatus 300 that may be, for example, associated with the text mining platform 150 of FIG. 1. The text mining apparatus 300 comprises a processor 310, such as one or more commercially available Central Processing Units (CPUs) in the form of one-chip microprocessors, coupled to a communication device 320 configured to communicate via a communication network (not shown in FIG. 3). The communication device 320 may be used to communicate, for example, with one or more text sources and/or insurance applications. The text mining apparatus 300 further includes an input device 340 (e.g., a mouse and/or keyboard to define semantic rules) and an output device 350 (e.g., a computer monitor to display reports and text mining results).

The processor 310 also communicates with a storage device 330. The storage device 330 may comprise any appropriate information storage device, including combinations of magnetic storage devices (e.g., a hard disk drive), optical storage devices, mobile telephones, and/or semiconductor memory devices. The storage device 330 stores a program 312 and/or a communications engine 314 (e.g., associated with a communications engine plug-in) for controlling the processor 310. The processor 310 performs instructions of the programs 312, 314, and thereby operates in accordance with any of the embodiments described herein. For example, the processor 310 may receive text input data and a semantic event in the text input data may be automatically detected, such as by being triggered by a semantic rule and associated semantic tag. A text mining result database 500 may then be updated by the processor 310 (e.g., by adding an entry to the database 500 identifying the detected semantic event and the triggering semantic rule). An indication associated with the text mining result database 500 may then be transmitted by the processor 310 to a plurality of insurance applications.

The programs 312, 314 may be stored in a compressed, uncompiled and/or encrypted format. The programs 312, 314 may furthermore include other program elements, such as an operating system, a database management system, and/or device drivers used by the processor 310 to interface with peripheral devices.

As used herein, information may be "received" by or "transmitted" to, for example: (i) the text mining apparatus 300 from another device; or (ii) a software application or module within the text mining apparatus 300 from another software application, module, or any other source.

In some embodiments (such as shown in FIG. 3), the storage device 330 further stores text input data 360, a semantic rules database 400, the text mining results database 500. Examples of databases that may be used in connection with the text mining apparatus 300 will now be described in detail with respect to FIGS. 4 and 5. Note that the database described herein is only one example, and additional and/or different information may be stored therein. Moreover, various databases might be split or combined in accordance with any of the embodiments described herein.

Figure 4:
FIG. 4 illustrates a tabular portion of a semantic rules database in accordance with some embodiments.

Referring to FIG. 4, a table is shown that represents the semantic rules database 400 that may be stored at the text mining apparatus 300 according to some embodiments. The table may include, for example, entries identifying rules and algorithms that may facilitate text mining. The table may also define fields 402, 404, 406 for each of the entries. The fields 402, 404, 406 may, according to some embodiments, specify: a semantic rule identifier 402, a rule description 404, and one or more semantic tags 408 for each rule. The semantic rules database 400 may be created and updated, for example, based on information received from an operator or administrator.

The semantic rule identifier 402 may be, for example, a unique alphanumeric code identifying logic that may be applied during text mining. The rule description 404 may describe the rule and the one or more semantic tags 406 may define when the rule is triggered. For example, the presence of the word "DOGS" in a claim file might trigger the semantic rule associated with identifier "SR_10002" to indicate that an "ANIMAL_BITE" might be associated with that claim file. According to some embodiments, the semantic rules database 400 may store multiple versions of a semantic rule (and different rule versions may be associated with different text mining results databases 500 versions).

Referring to FIG. 5, a table is shown that represents the text mining results database 500 that may be stored at the text mining apparatus 300 according to some embodiments. The table may include, for example, entries identifying results of a text mining operation. The table may also define fields 502, 504, 506, 508, 510 for each of the entries. The fields 502, 504, 506, 508, 510 may, according to some embodiments, specify: a text mining result identifier 502, a loss event 504, a date 506, a rule identifier 508, and a claim identifier 510. The text mining results database 500 may be created and updated, for example, based on an analysis of text input data received from multiple sources. Note that text mining operations and analysis might be performed on historical text input data in addition to, or instead of, current text input data.

The text mining result identifier 502 may be, for example, a unique alphanumeric code identifying a result of text analysis. The loss event 504 might categorize a cause associated with the event and the date 506 might indicate when the loss occurred. The rule identifier might indicate which rule resulted in the entry being created and may be based on, or associated with, the semantic rule identifier 402 stored in the semantic rule database 400. The claim identifier 510 might indicate a claim file associated with the event and/or an associated insurance policy. Note that other identifiers may be stored in the text mining results database in addition to, or instead of, the claim identifier 510. Examples of such other identifiers include a party identifier, a policy identifier, an entity identifier, a tax identifier, a physician identifier, etc.

Figure 6:
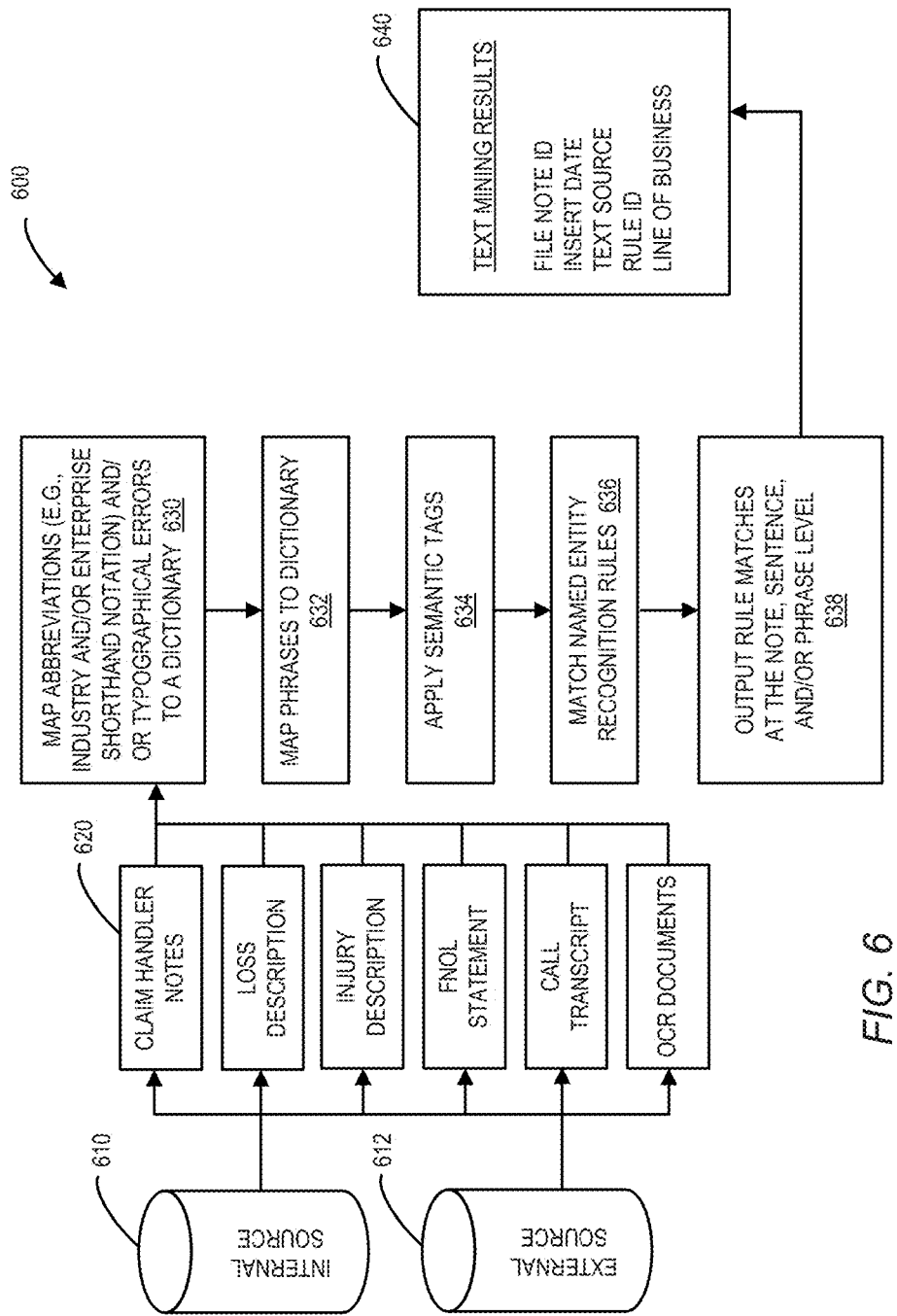
FIG. 6 illustrates a data flow according to some embodiments of the present invention.

FIG. 6 illustrates a data flow 600 according to some embodiments of the present invention. Initially, text data may be pulled from one or more internal sources 610 and/or external sources 612 (e.g., on a daily basis). The pulled data may be associated with, for example, various insurance applications and/or data types 620, such as claim handler notes, loss descriptions, injury descriptions, FNOL statements, call transcripts, and/or OCR documents. Note that other types of information (e.g., reports from a highway safety board) might also be processed.

The pulled data may then be processed in accordance with any of the embodiments described herein (e.g., in connection with a master domain). In particular, abbreviations (e.g., associated with industry and/or enterprise-specific shorthand and jargon) and/or typographical errors may be mapped to a dictionary 630, phrases may be mapped to a dictionary 632, semantic tags may be applied 634, and/or named entity recognition rules may be matched 636. As a result of such processing, rule matches may be output at the note, sentence, and/or phrase level 638. For example, entries or records may be inserted into a text mining results database 640 (e.g., including fields such as a file note identifier, date of insertion, a text source, etc.). Note that a single input file or record might result in multiple results being inserted into the database.

According to some embodiments, such a data flow 600 may allow for the use of common domain dictionaries (e.g., including shorthand terms, common prescriptions, and/or insurance carrier names). Moreover, a composite named entity recognition rules library may provide for daily processing of text fields and rule changes may be tracked over time for analysis. In addition, performance monitoring might be performed in connection with indicator incidence rate trending and new rules can be introduced with minimal code changes. According to some embodiments, a batch process may create a history for new and/or changed rules associated with the data flow 600.

According to some embodiments, the text mining associated with the data flow is a "big data" activity that may use machine learning to sift through large amounts of unstructured data to find meaningful patterns to support business decisions. As used herein, the phrase "big data" may refer to massive amounts of data that are collect over time that may be difficult to analyze and handle using common database management tools. This type of big data may include business transactions, email messages, activity logs, and/or machine-generated data. In addition, data from sensors, unstructured text posted on the Internet, such as blogs and social media, may be included in embodiments described herein.

According to some embodiments, the text mining performed herein may be associated with hypothesis testing. For example, one or more theories may be provided (e.g., "the presence of a landlord increases chances of subrogation," "a pre-existing injury is a red flag for fraud," and/or "diabetes is a comorbidity that increases the duration of lost time claims"). Knowledge engineering may then translate common notation terms, correct typographical errors, and create smart tags for industry and scenario specific business context analysis. According to some embodiments, Natural Language Processing ("NLP") may parse text streams into phrases and Named Entity Recognition ("NER") rules may identify important concepts that are used to augment other structured data elements as predictor variables in models.

The NER rules may be stored in an NER rule library and may include individual indicators. For example, indicators associated with a subrogation analysis might include the following words or phrases: animal bite, attorney, carrier, contractor, landlord, lawsuit, low subrogation, motor vehicle accident, no subrogation, off premises, responsible party, self-inflicted, third party, and/or zero paid. As other examples, indicators associated with a fraud detection analysis might include the following words or phrases: disputed injury, no evidence, pre-existing condition, prior history, recent hire, terminated, unhappy, un-witnessed injury, claimant lacks documentation, claimant not employee, claimant paid in cash, no Social Security number, employer paid un-reported bill, employer won't confirm information, hazardous material, and/or excluded business. As still other examples, indicators associated with a recovery factor analysis might include: alcohol, complications, diabetes, high blood pressure, narcotics, pre-existing condition, obesity, osteoarthritis, smoking, substance abuse, and/or elderly care.

In some embodiments, the text mining described herein may be associated with insight discovery wherein unsupervised data mining techniques may be used to discover common patterns in data. For example, highly recurrent themes may be classified, and other concepts may then be highlighted based on a sense of adjacency to these recurrent themes. In some cases, cluster analysis and drilldown tools may be used to explore the business context of such themes. For example, sentiment analysis may be used to determine how an entity is currently perceived and/or the detection of a real-world event may be triggered (e.g., it might be noted that a particular automobile model is frequently experiencing a particular unintended problem).

Figure 7:
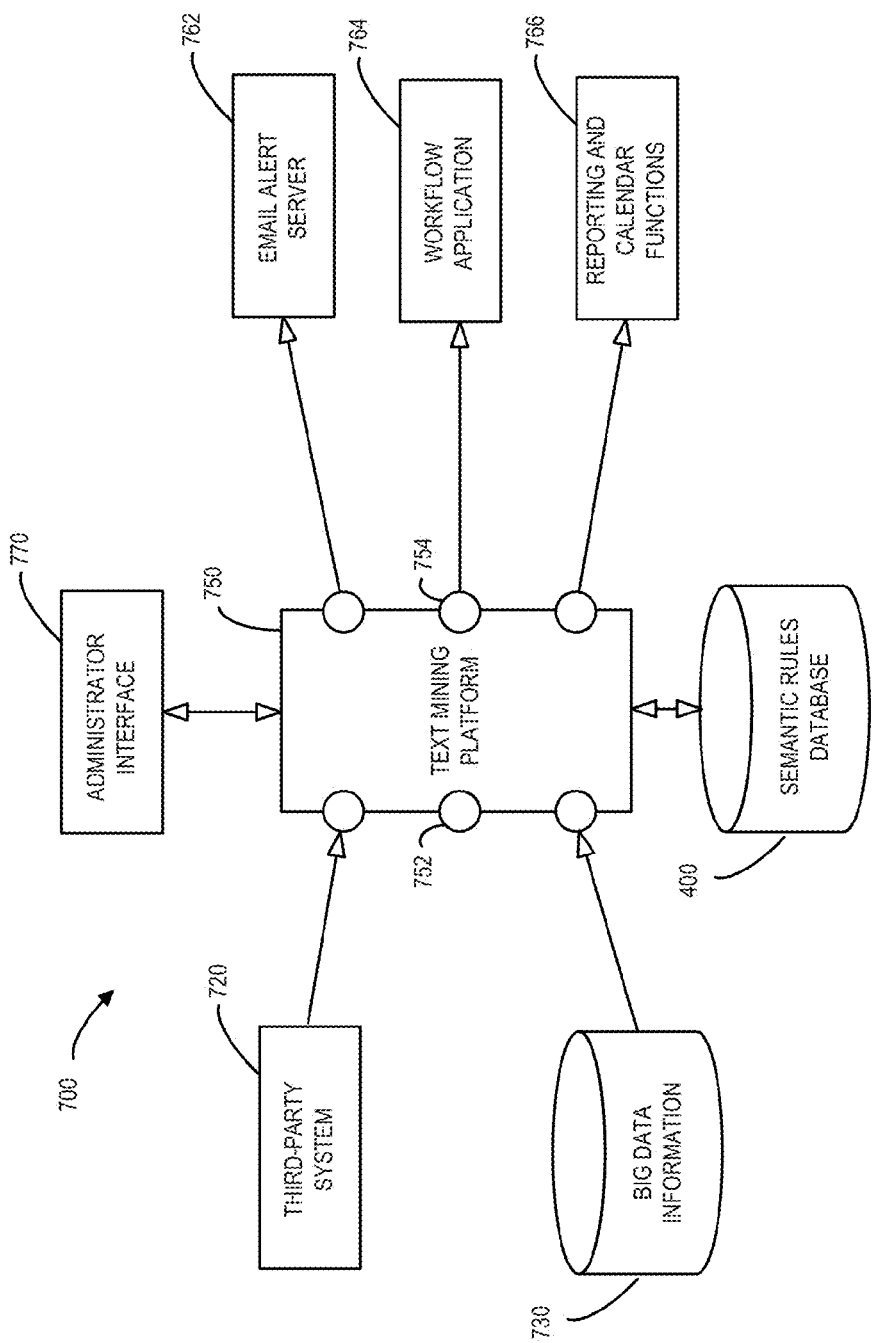
FIG. 7 is block diagram of a system according to some embodiments of the present invention.

FIG. 7 is block diagram of a system 700 according to some embodiments of the present invention. As with the system of 100 of FIG. 1, the system 700 includes a text mining platform 750 that receives information from sources, including the semantic rules database 400 (described with respect to FIG. 4), a third-party system 720 (e.g., a hospital) and/or big data information 730. The text mining platform 750 might be, for example, associated with a PC, enterprise server, a server farm, etc.

According to some embodiments, an "automated" text mining platform 750 may access semantic rules in the semantic rules database 400 to mine the received text. The text mining platform 750 may then transmit results to external systems, such as an email alert server 762, a workflow application 764, and/or reporting and calendar functions 766 (e.g., executing on a server). According to some embodiments, a graphical administrator interface 770 may provide an ability to access and/or modify the semantic rules database 400 via the text mining platform 750. The administrator interface 770 might, for example, let an administrator define terms, dictionaries, mapping rules, etc. associated with text mining.

The text mining platform 750 may include a number of input nodes 752 and/or output nodes 754, such as notes 752, 754 associated with protocols and/or Application Programming Interface ("API") connections. Information provided via the output nodes 754 may, for example, be used to augment structured data as independent variables in predictive models (e.g., a subrogation might look for indications of third party liability, a fraud detection process might to look for a set of red flags, a large Loss/volatile claims might look for comorbidity, biological, psychological, and/or social conditions, and a premium evasion process might look for understatement of workforce and misclassified business flags).

The information provided via the output nodes 754 may also, for example, as an event detector to drive alerts to a business, to identify insurance claims that merit re-scoring, to alert a business to a change in claim state for escalation or re-assignment, and/or to transmit alarms indicating the presence of a foreign Manufacturer on a general liability claim. According to some embodiments, mined indicators from claims may be used to sample and/or compare insurance policies (e.g., to compare policies based on the incidence rate of comorbidities).

Figure 8:
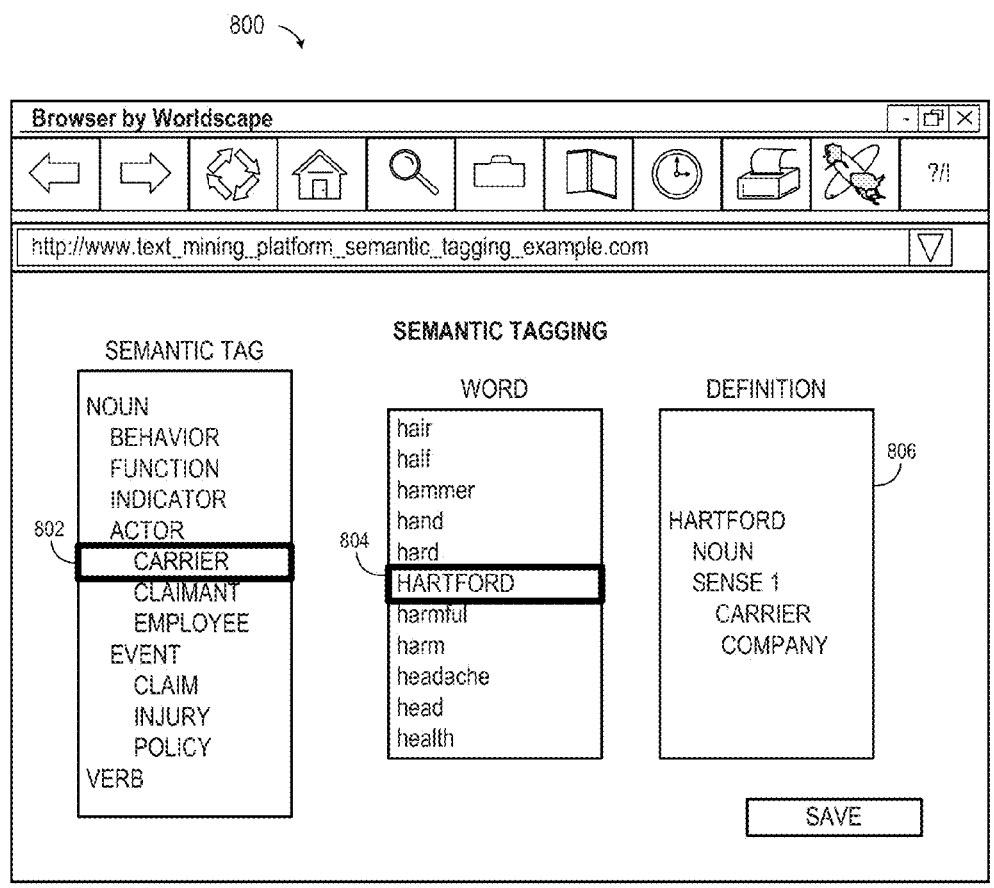
FIG. 8 illustrates a semantic tagging graphical user interface in accordance with some embodiments of the present invention.

The administrator interface 770 may display various graphical user interfaces to an administrator. For example, FIG. 8 illustrates a semantic tagging graphical user interface 800 in accordance with some embodiments of the present invention. The semantic tagging interface 800 may let the administrator select one or more words 804 in a library as a "semantic tag" 802 and/or provide a definition 806 (e.g., a hierarchy of data elements may device the word "Hartford" as an insurance "carrier" and "company" as illustrated in FIG. 8).

Figure 9:
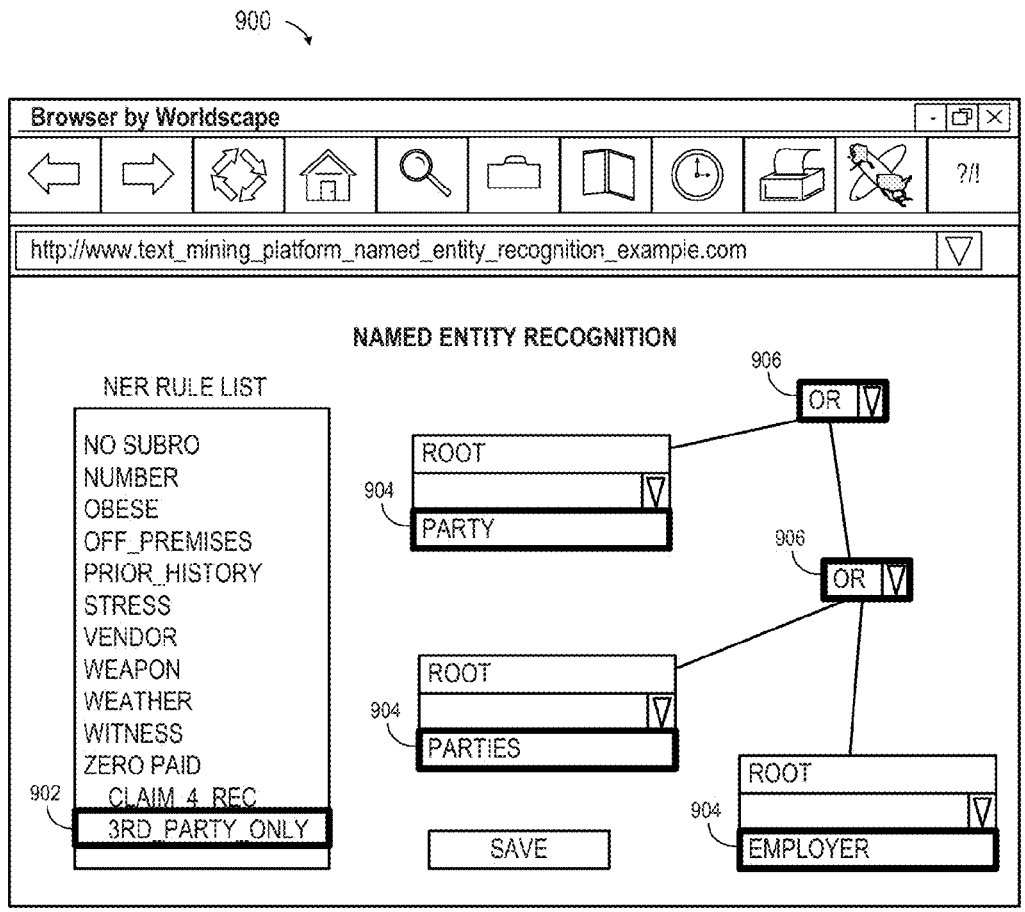
FIG. 9 illustrates a named entity recognition graphical user interface in accordance with some embodiments of the present invention.

FIG. 9 illustrates a named entity recognition graphical user interface 900 that may be provided via the administrator interface 770 in accordance with some embodiments of the present invention. In particular, the named entity recognition graphical user interface 900 may let the administrator select a named entity recognition rule 902 from a list of rules. Various root words 904 may then be tied together via logical connectors 906 to define the selected rule (e.g., the presence of "party" or "parties" or "employer" may trigger a "3RD_PARTY_ONLY" rule as illustrated in FIG. 9.

Figure 10:
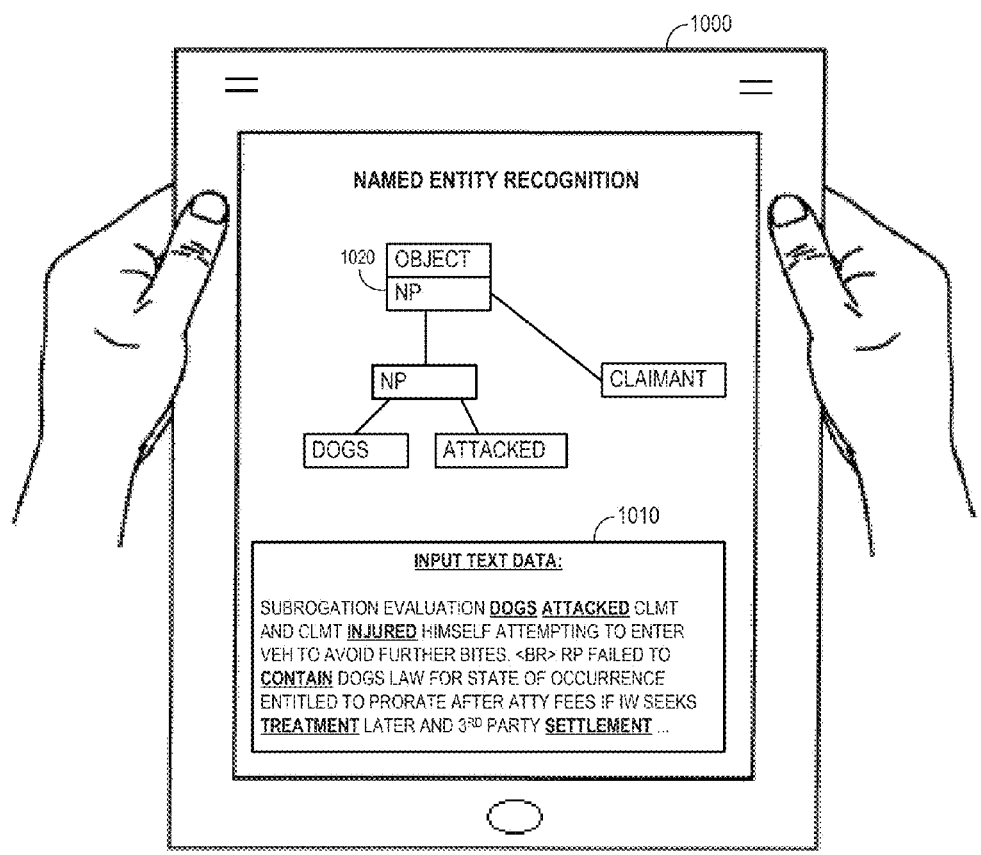
FIG. 10 illustrates a wireless or tabular device in accordance with some embodiments of the present invention.

FIG. 10 illustrates a wireless or tabular device 1000 displaying results 1010 of a named entity recognition process in accordance with some embodiments of the present invention. For example, in some embodiments, the device 1000 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity.

The device 1000 may be used to graphically tie together various Noun Phrases ("NP") 1020 in association with sentence subjects, clauses, objects, etc. For example, the results 1010 illustrated in FIG. 10 display the triggered words in bold and underlined text (e.g., "dogs," "attacked," "injured," etc.). In this way, the interfaces described herein may be used to map typographical errors in the text input data to a word dictionary, map phrases in the text input data to a phrase dictionary, apply semantic tags to the mapped phrases, match named entity recognition rules based on the applied semantic tags, and/or output rule matches at a level representing at a note level, a sentence level, and/or a phrase level.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with insurance policies and associated claims. Note, however, that other types of business and insurance data may also benefit from the invention. For example, embodiments of the present invention may be used in connection with automobile insurance policies, etc.

Moreover, although some embodiments have been described with respect to particular text mining approaches, note that any of the embodiments might instead be associated with other text processing techniques. For example, natural language processing may operate to mine certain characteristic information from various social networks to determine whether a party is engaging in certain risky behavior or providing high risk products. It is also contemplated that embodiments may process recommendations in one or more languages, such English, French, Arabic, Spanish, Chinese, German, Japanese and the like. In an exemplary embodiment, a system can be employed for sophisticated text analyses, wherein text can be recognized irrespective of the text language. The relationships between the various words/phrases can be clarified by using a rules engine for classifying words/phrases as a predictor of certain underwriting risk.

According to some embodiments, text data may be used in conjunction with one or more predictive models to take into account a large number of underwriting and/or other parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior text data and outcomes known to the insurance company. The specific text data and outcomes analyzed may vary depending on the desired functionality of the particular predictive model. The particular text data parameters selected for analysis in the training process may be determined by using regression analysis and/or other statistical techniques known in the art for identifying relevant variables and associated weighting factors in multivariable systems. The parameters can be selected from any of the structured data parameters stored in the present system, whether the parameters were input into the system originally in a structured format or whether they were extracted from previously unstructured text, such as from big data.

In the present invention, the selection of weighting factors (either on a keyword level or a text source level) may improve the predictive power of the text mining. For example, more reliable text sources may be associated with a higher weighting factor, while newer or less reliable sources might be associated with a relatively lower weighting factor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system for evaluating text data to support multiple insurance applications, comprising:
    a communication device to receive text input data from multiple sources;
    a processor coupled to the communication device; and
    a storage device in communication with said processor and storing instructions adapted to be executed by said processor to:
        aggregate and map the received text input data to create composite text input data;
        automatically detect a semantic event in the composite text input data triggered by a semantic rule and associated semantic tag,
        flag the detected semantic event as meeting a pre-determined condition,
        update a text mining result database, responsive to the flag, by adding an entry to the database identifying the detected semantic event and the triggering semantic rule, and
        transmit an indication associated with the text mining result database to a plurality of insurance applications.

2. The system of claim 1, wherein the text input data is associated with at least one of: (i) an insurance claim file, (ii) an insurance claim note, (iii) a medical report, (iv) a police report, (v) social network data, (vi) big data information, (vii) a loss description, (viii) an injury description, (ix) a final notice of loss statement, (x) telephone call transcript, (xi) optical character recognition data, (xii) third-party data, and (xiii) a governmental agency.

3. The system of claim 1, wherein the insurance applications are associated with at least two of: (i) a workers' compensation claim, (ii) a personal insurance policy, (iii) a business insurance policy, (iv) an automobile insurance policy, (v) a home insurance policy, (vi) a sentiment analysis, (vii) insurance event detection, (viii) a cluster analysis, (ix) a predictive model, (x) a subrogation analysis, (xi) fraud detection, (xii) a recovery factor analysis, (xiii) large loss and volatile claim detection, (xiv) a premium evasion analysis, (xv) an insurance policy comparison, (xvi) an underwriting decision, and (xvii) indicator incidence rate trending.

4. The system of claim 1, wherein the transmitted indication is to: (i) trigger an insurance application, or (ii) update an insurance application.

5. The system of claim 1, wherein the transmitted indication is associated with a variable or weighing factor of a predictive model.

6. The system of claim 1, wherein multiple versions of the semantic rule are maintained along with multiple versions of the text mining result database.

7. The system of claim 1, wherein the semantic event is associated with at least one of: (i) a word, (ii) a phrase, (iii) a shorthand term, (iv) a prescription drug, and (v) an insurance carrier name.

8. The system of claim 1, wherein the triggering semantic rule is associated with at least one of: (i) a noun, (ii) a verb, (iii) a definition, (iv) a semantic tree, (v) a named entity recognition rule, (vi) a root, (vii) a noun phrase, (viii) a prepositional phrase, and (ix) a verb phrase.

9. The system of claim 8, wherein the triggering semantic rule was defined by an administrator using a graphical user interface.

10. The system of claim 1, wherein the storage device further stores instructions adapted to be executed by said processor to:
  map typographical errors in the composite text input data to a word dictionary,
  map abbreviations in the composite text input data to the word dictionary,
  map phrases in the composite text input data to a phrase dictionary,
  apply semantic tags to the mapped phrases,
  match named entity recognition rules based on the applied semantic tags, and
  output rule matches at a level representing at least one of: (i) a note level, (ii) a sentence level, and (iii) a phrase level.

11. A computer-implemented method for evaluating text data to support multiple insurance applications, comprising:
  receiving, at a text mining platform, text input data from multiple sources including a source internal to an insurance enterprise and a source external to the insurance enterprise;
  aggregating and mapping the received text input data to create composite input text data;
  automatically detecting, by a computer processor of the text mining platform, a semantic event in the composite text input data triggered by a semantic rule and associated semantic tag;
  updating, by the computer processor, a text mining result database by adding an entry to the database, the entry including: (i) a file note identifier, (ii) an insert date, (iii) a text source, (iv) a rule identifier, and (v) a line of business; and
  transmitting, by the computer processor, an indication associated with the text mining result database to a plurality of insurance applications.

12. The method of claim 11, wherein the text input data is associated with at least one of: (i) an insurance claim file, (ii) an insurance claim note, (iii) a medical file, (iv) a police report, (v) social network data, (vi) big data information, (vii) a loss description, (viii) an injury description, (ix) a final notice of loss statement, (x) telephone call transcript, (xi) optical character recognition data, (xii) third-party data, and (xiii) a governmental agency.

13. The method of claim 11, wherein the insurance applications are associated with at least two of: (i) a workers' compensation claim, (ii) a personal insurance policy, (iii) a business insurance policy, (iv) an automobile insurance policy, (v) a home insurance policy, (vi) a sentiment analysis, (vii) insurance event detection, (viii) a cluster analysis, (ix) a predictive model, (x) a subrogation analysis, (xi) fraud detection, (xii) a recovery factor analysis, (xiii) large loss and volatile claim detection, (xiv) a premium evasion analysis, (xv) an insurance policy comparison, (xvi) an underwriting decision, and (xvii) indicator incidence rate trending.

14. The method of claim 11, further comprising:
  mapping typographical errors in the text input data to a word dictionary;
  mapping the composite text input data to the word dictionary;
  mapping phrases in the composite text input data to a phrase dictionary;
  applying semantic tags to the mapped phrases;
  matching named entity recognition rules based on the applied semantic tags; and
  outputting rule matches at a level representing at least one of: (i) a note level, (ii) a sentence level, and (iii) a phrase level.

15. The method of claim 11, wherein said detecting is performed at least one of: (i) on a periodic basis, (ii) upon a change in the text input data, (iii) on a daily basis, and (iv) responsive to a request.

16. A non-transitory computer-readable medium storing instructions adapted to be executed by a computer processor to perform a method, said method comprising:
  receiving text input data from multiple sources;
  aggregating and mapping the received text input data to create composite text input data
  automatically detecting a semantic event in the composite text input data triggered by a semantic rule and associated semantic tag;
  updating a text mining result database by adding an entry to the database identifying the detected semantic event and the triggering semantic rule; and
  transmitting an indication associated with the text mining result database to a plurality of insurance applications.

17. The medium of claim 16, wherein the method further comprises:
  mapping typographical errors in the composite text input data to a word dictionary;
  mapping abbreviations in the composite text input data to the word dictionary;
  mapping phrases in the composite text input data to a phrase dictionary;
  applying semantic tags to the mapped phrases;
  matching named entity recognition rules based on the applied semantic tags; and
  outputting rule matches at a level representing at least one of: (i) a note level, (ii) a sentence level, and (iii) a phrase level.

18. The medium of claim 17, wherein said detecting is performed at least one of: (i) on a periodic basis, (ii) upon a change in the text input data, (iii) on a daily basis, and (iv) responsive to a request.

19. The medium of claim 18, wherein the triggering semantic rule is associated with at least one of: (i) a noun, (ii) a verb, (iii) a definition, (iv) a semantic tree, (v) a named entity recognition rule, (vi) a root, (vii) a noun phrase, (viii) a prepositional phrase, and (ix) a verb phrase.

* * * * *